(12) United States Patent
Tsai (10) Patent No.: US 6,229,629 B1
(45) Date of Patent: May 8, 2001

(54) DEVICE AND METHOD FOR QUICK AND PRECISE DETERMINATION OF SCAN START POINT FOR IMAGE SCANNER

(75) Inventor: Jenn-Tsair Tsai, Taipei Hsien (TW)

(73) Assignee: Mustek Systems Inc. (TW)

( * ) Notice: Subject to any disclaimer, the term of this patent is extended or adjusted under 35 U.S.C. 154(b) by 0 days.

(21) Appl. No.: 09/152,152

(22) Filed: Sep. 11, 1998

(30) Foreign Application Priority Data

Sep. 12, 1997 (TW) .................................................. 86113269

(51) Int. Cl.$^7$ ........................................................ H04N 1/04
(52) U.S. Cl. ............................................. 358/486; 358/497
(58) Field of Search ..................................... 358/486, 488, 358/482, 483, 406, 497, 494, 504, 506, 487; 250/559.29; 355/75; 399/380

(56) References Cited

U.S. PATENT DOCUMENTS

| 4,933,778 | * | 6/1990 | Tufano | 358/488 |
| 5,033,102 | * | 7/1991 | Nakajima et al. | 382/282 |
| 5,144,455 | | 9/1992 | Stein et al. | 358/443 |
| 5,198,907 | * | 3/1993 | Walker et al. | 358/406 |
| 5,719,404 | * | 2/1998 | Tsai | 250/559.29 |
| 6,061,147 | * | 5/2000 | Lee | 358/406 |

* cited by examiner

*Primary Examiner*—Cheukfan Lee
(74) *Attorney, Agent, or Firm*—Skjerven Morrill MacPherson LLP; Alan H. MacPherson (57) ABSTRACT

A method for quick determination of a scan start point for an image scanner is disclosed. The image scanner includes a photo-processing device and a scanning platform for placing thereon a document to be scanned. The scanning platform is printed with a pattern mark which is located between a home position and a scan start point of the photo-processing device, and has a specified point being a predetermined first shift to the scan start point along a specific direction. According to the method, the photo-processing device moves a predetermined distance from the home position to a pre-scan position overlapping with the pattern mark, then moves a calculated distance from the pre-scan position to the specified point, and moves another predetermined distance from the specified point to the scan start point along the specific direction.

30 Claims, 6 Drawing Sheets

DEVICE AND METHOD FOR QUICK AND PRECISE DETERMINATION OF SCAN START POINT FOR IMAGE SCANNER

FIELD OF THE INVENTION

The present invention is related to an image scanner, and more particularly to an image scanner which includes means for determining a scan start point quickly and precisely. The present invention is also related to a method for determining a scan start point quickly and precisely for an image scanner.

BACKGROUND OF THE INVENTION

Nowadays, an image scanner has gradually become standard peripheral equipment of a personal computer. Therefore, scanner manufacturers have been trying their best to improve the scanning quality, for example, to compensate for brightness, chrominance, etc., and/or correct scanning line errors. On the other hand, high scanning speed is also a criterion of an exquisite image scanner.

In order to enhance the scanning speed of an image scanner, several devices and methods have been proposed in prior art. For example, please refer to FIG. 1 which schematically shows home-sensor means for speeding up the movement of an image pickup module 11 from a standby line N to a scan start line M, i.e. a document reference line. In this case, it is assumed that the image pickup module 11 reaches the scan start line M after moving a distance d from the standby line N along the arrow direction. In other words, the image pickup module 11 directly moves a predetermined distance, rather than moving pixel by pixel to detect the presence of a document, and then starts scanning. Therefore, the movement of the image pickup module 11 from the standby line N to the scan start line M is fast.

However, there are likely to be defects resulting from errors of various parts and/or assembling inaccuracy in this home sensor means. For example, if the image pickup module 11 is inaccurately installed at a position lower than a predetermined one while assembling, i.e. the standby line is lowered, the actual scan start line M1 will be accordingly lower than the document reference line M after the same distance d of movement, referring to the dotted lines and the dotted arrow in FIG. 1. Therefore, the top portion 13 of the document 12 will be missed in the scanning operation.

On the other hand, when the image pickup module 11 reaches the scan start line M, the nth pixel unit of a CCD of the image pickup module 11 generally serves as the start point of the same scanning line, and the nth pixel unit and the pixel units thereafter are used to simultaneously pick up the image of the document line by line. If the image pickup module 11 deflects from its predetermined path owing to an assembling defect, the same distance d of movement will make the image pickup module 11 reach another line rather than the predetermined scan start line M so that the scanning lines will slant. Therefore, the scanning quality will be adversely affected.

Figure 1:
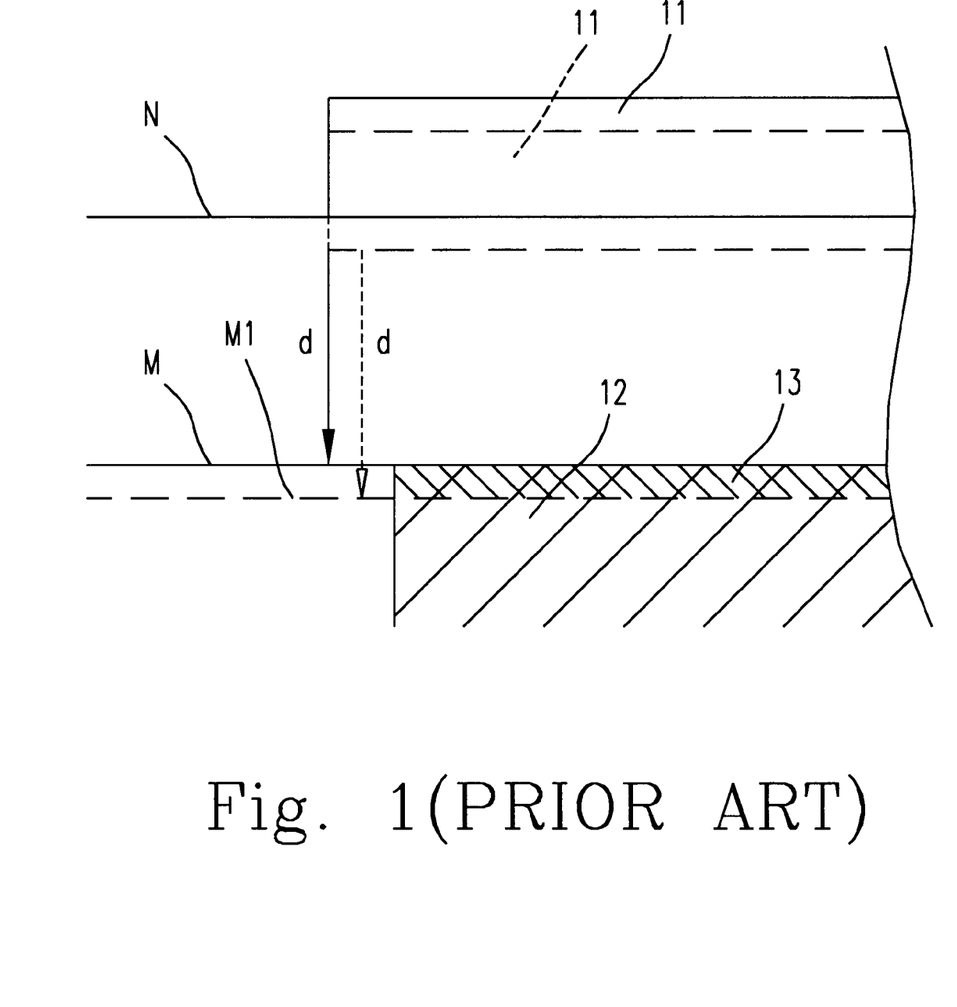
FIG. 1 schematically shows conventional means for locating a scan start of an image scanner, and a possible error is revealed.
Figure 2:
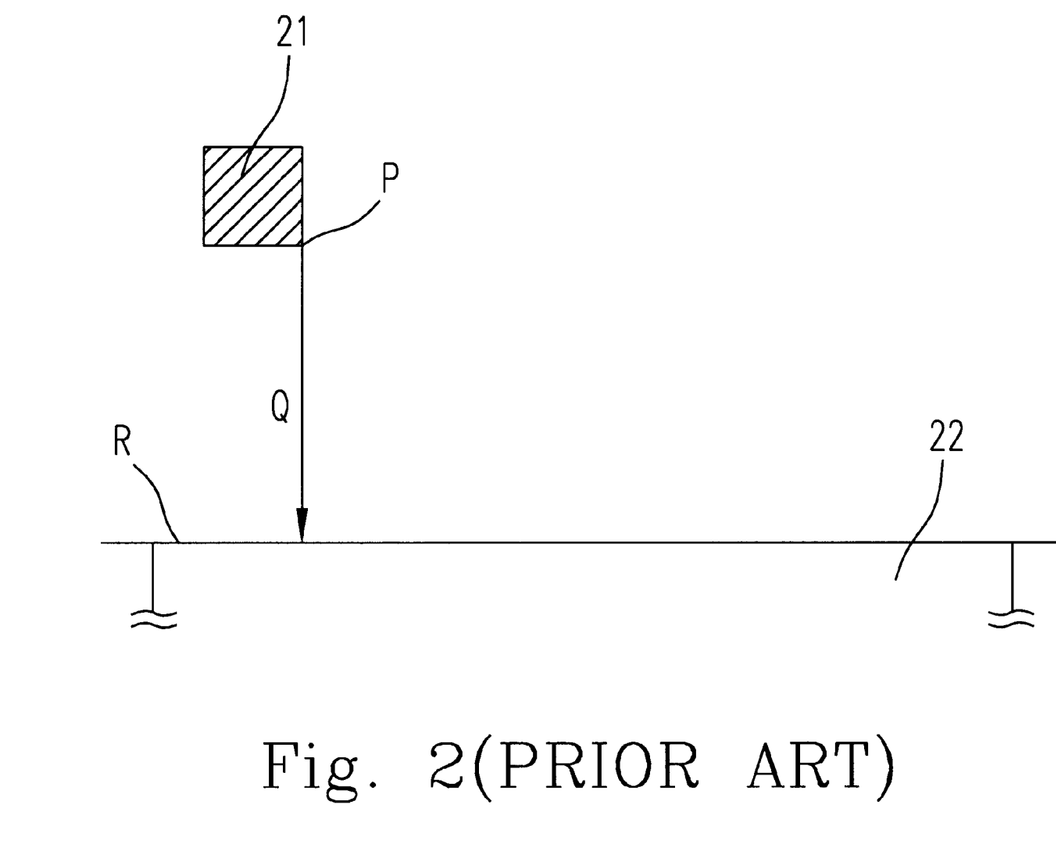
FIG. 2 schematically shows another conventional means for locating a scan start of an image scanner.

Another conventional means is proposed to avoid the missing of document data. Please refer to FIG. 2 which schematically shows means for precisely determining a scan start point in an image scanner. On the scanning platform of this image scanner, a black region 21 is provided in front of a scan start line R where a front edge of a document 22 to be scanned is positioned. In this case, the image pickup module (not shown) quickly moves toward the black region 21, and then slowly passes through the black region 21 after reaching the black region 21 to detect the disappearance of the black color. When the detected black color disappears, the image pickup module keeps on moving and begins to measure a distance Q along the arrow direction. It is assumed that the scan start line R is reached after the image pickup module moves the distance Q from the reference point P. In this way, the downshift error resulting from the downshift installation of the image pickup module, as shown in FIG. 1, can be avoided because the predetermined distance Q is measured from the lower edge of the black region, i.e. the reference point P, rather than from the standby line of the image pickup module. Nevertheless, the defect of the conventional scanner resulting from the deflection of the scanning lines still exists in this means, and is not resolved.

SUMMARY OF THE INVENTION

Therefore, an object of the present invention is to provide a device and a method for an image scanner, which can determine a scan start point quickly and precisely so as to enhance the overall scanning speed of the image scanner.

Another object of the present invention is to provide a device and a method for an image scanner, in which the scanning quality can be improved by easily and conveniently performing color calibration, and detection and correction of a deflection rate and/or an amplification error.

According to a first aspect of the present invention, an image scanner includes a photo-signal processing device which is capable of moving along a specific direction from a home position for picking up an image of a scanned document, and converting the image into digital data to be further processed; and a scanning platform for placing thereon the document. The scanning platform has thereon a first pattern mark located between the home position and the scan start point, coordinates of a first reference point and a second reference point within the first pattern mark being read when the photo-signal processing device moves to a pre-scan position and performs a pre-scan operation, and the coordinates of the first and the second reference points correlating with a shift L1 from the pre-scan position to a specified point of the first pattern mark along the specific direction through a first mathematical function, wherein a scan start point of the photo-signal processing device for picking up the image of the scanned document is determined by the coordinates of the first and the second reference points, the first mathematical function, and a predetermined shift L2 from the specified point to the scan start point along the specific direction.

Preferably, the photo-signal processing device starts to perform a scanning operation after traveling a distance of (L0+L1+L2) from the home position along the specific direction, in which L0 is a predetermined shift from the home position to the pre-scan position, L1 is the shift from the pre-scan position to the specified point, and L2 is the predetermined shift from the specified point to the scan start point along the specific direction. The traveling is quick because L0 and L2 are predetermined, and L1 is determined by calculation.

Preferably, the scanning platform further has thereon a second pattern mark. Coordinates of a third reference point and a fourth reference point of the second pattern mark as well as the coordinates of the first and the second reference points are read during the pre-scan operation in order to calculate a deflection rate and an amplification error of a scanning result.

Preferably, the first and the second pattern marks are printed with black, and a background of the pattern marks is standard white for a color calibration during the pre-scan operation to obtain a light response.

A second aspect of the present invention is directed to a method for quick determination of a scan start point for an image scanner. The image scanner includes a photo-signal processing device which moves from a home position along a specific direction for picking up an image of a scanned document, and converts the image into digital data to be further processed, and a scanning platform for placing thereon the document, which has thereon a first pattern mark located between the home position and the scan start point, and has a specified point being a predetermined first shift to the scan start point along the specific direction. The method according to the present invention includes steps of:

(a) the photo-signal processing device moving from the home position along the specific direction to a pre-scan position overlapping with the first pattern mark;
(b) the photo-signal processing device performing a pre-scan operation at the pre-scan position to read coordinates of a first reference point and a second reference point within the first pattern mark;
(c) determining a second shift from the pre-scan position to the specified point along the specific direction according to the coordinates of the first and the second reference points, and a first mathematical function related to a pattern of the first pattern mark; and
(d) the photo-signal processing device moving from the pre-scan position along the specific direction a total shift in relation to the first and the second shifts so that the photo-signal processing device can quickly reach the scan start point, and start a scanning operation.

Preferably, the photo-signal processing device also overlaps with a second pattern mark at the pre-scan position in the step (a), and in the step (b), the photo-signal processing device performs the pre-scan operation at the pre-scan position to read coordinates of a third and a fourth reference points within the second pattern mark in addition to the first and the second reference point. The coordinates of the first, the second, the third and the fourth reference points are used to estimate a deflection rate and an amplification error for a scanning result.

BRIEF DESCRIPTION OF THE DRAWING

The present invention may best be understood through the following description with reference to the accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 3:
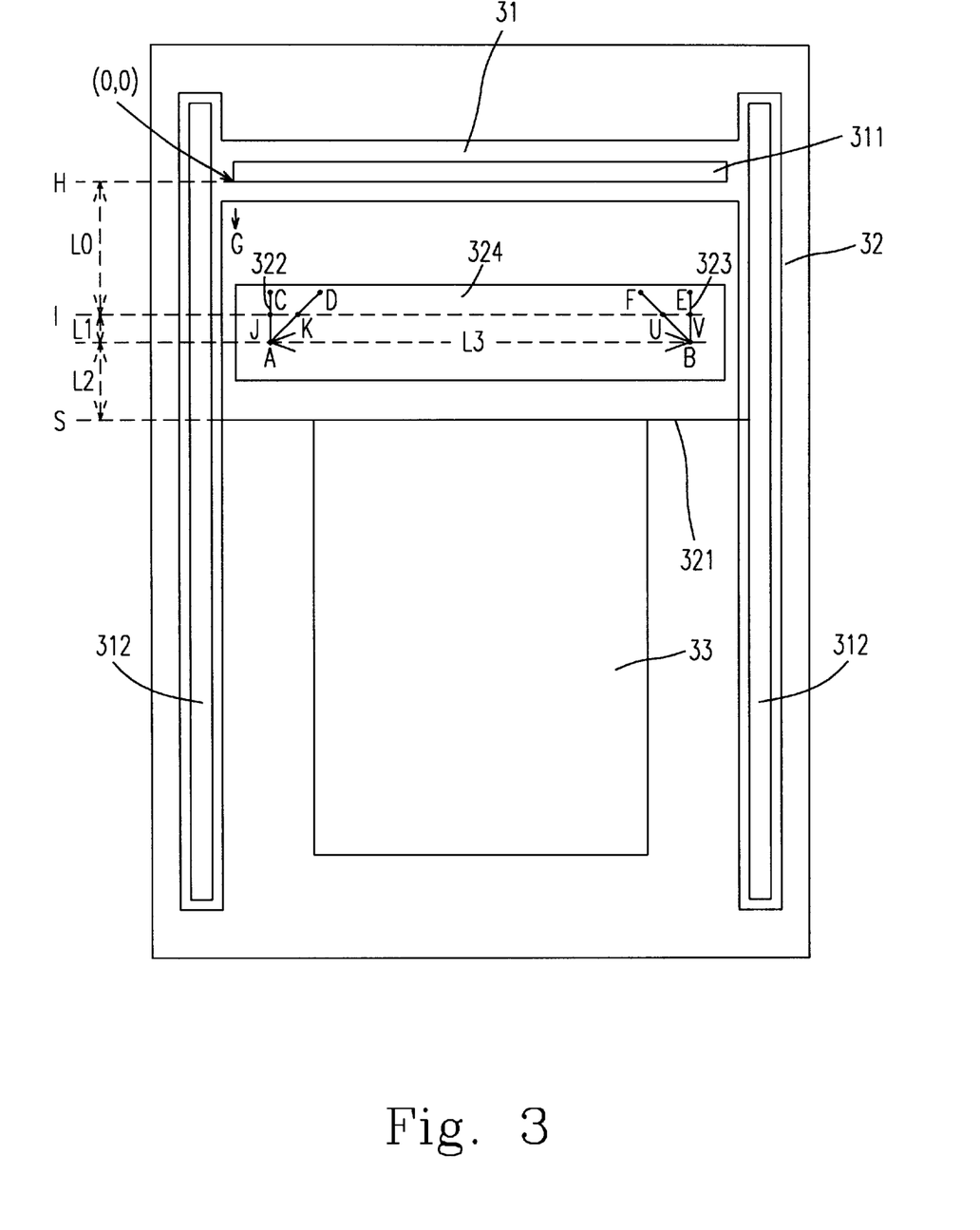
FIG. 3 schematically shows a preferred embodiment of an image scanner according to the present invention.
Figure 4:
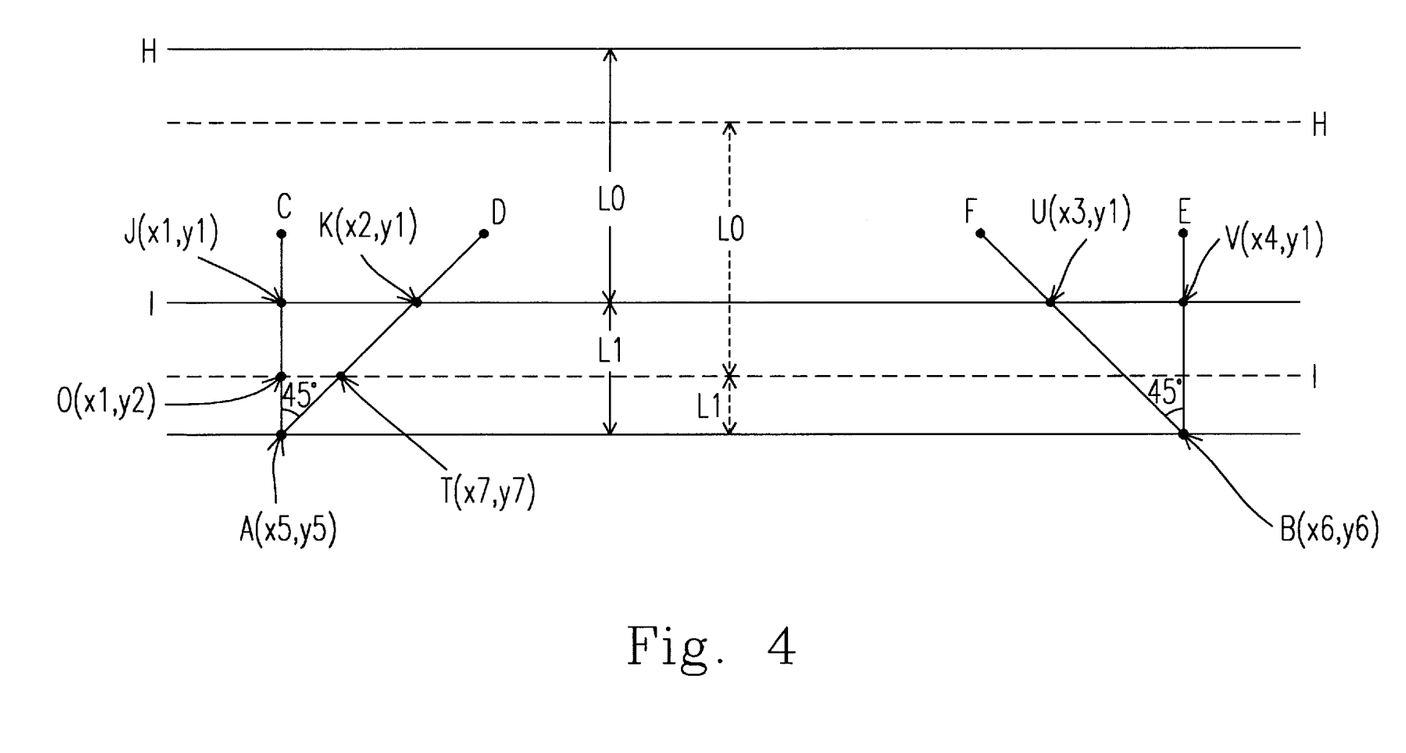
FIG. 4 is an enlarged view of an example of pattern marks used in the image scanner of FIG. 3.
Figure 5A:
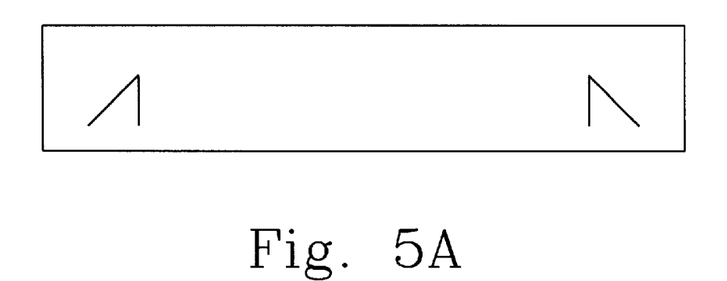
FIGS. 5A~5G illustrate alternative examples of pattern marks according to the present invention.
Figure 5B:
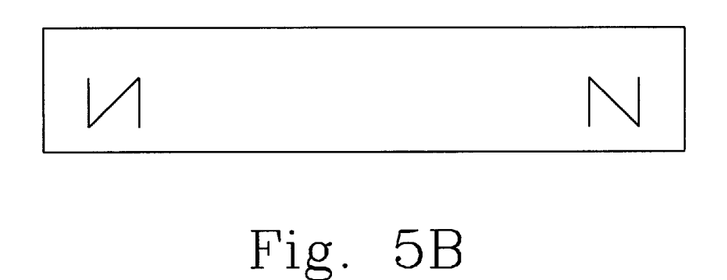
Figure 5C:
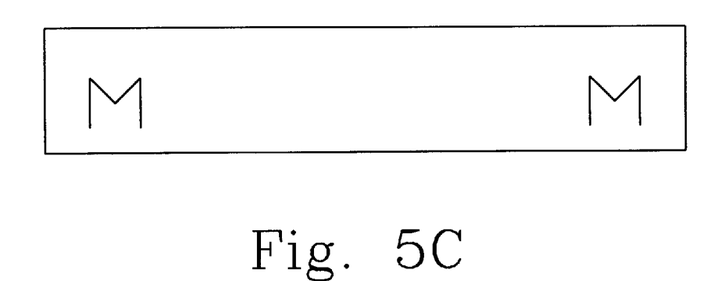
Figure 5D:
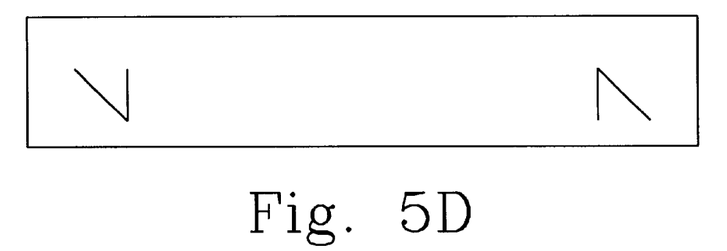
Figure 5E:
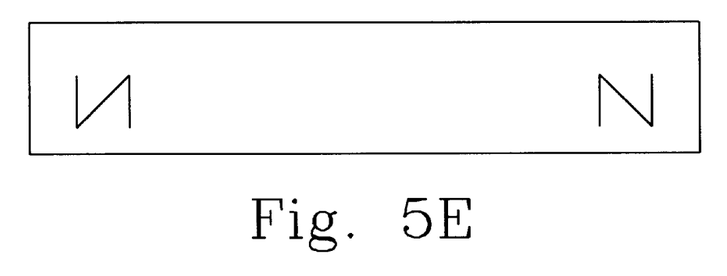
Figure 5F:
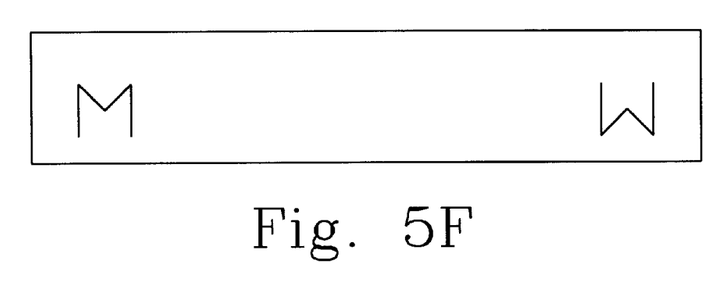
Figure 5G:
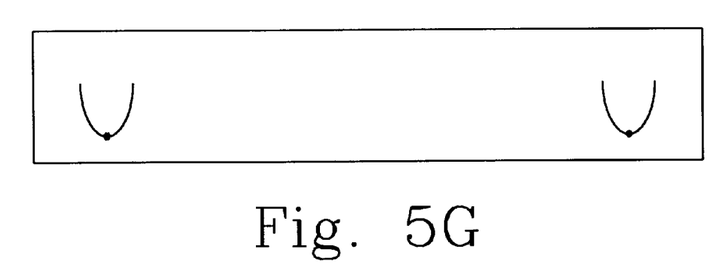

Please refer to FIG. 3 which is a schematic diagram showing a preferred embodiment of an image scanner according to the present invention from a top view. The image scanner includes a photo-signal processing device 31 and a scanning platform 32. The photo-signal processing device 31 includes an image pickup device 311 and a driving device 312. The image pickup device 311 is for example a CCD having a series of pixel units. The driving device 312 for example includes a motor device, a gear device, and a belt device (not shown), which are well known to those skilled in the art and will not be redundantly described here. The pixel units of the CCD 311 serve as the X-axis of a coordinate, and the movement track of the first pixel unit along the direction of the arrow A serves as the Y-axis of the coordinate. In other words, the coordinate position of the first pixel unit at the original position is (0,0). The scanning platform 32 has marked thereon a document line 321, a first pattern mark 322, a second pattern mark 323, and a background region 324. In this embodiment, each of the pattern marks 322 and 323 is printed on the white background region 324 with standard black, and consists of a first sectional line of a predetermined first slope and a second sectional line of a predetermined second slope. For example, with reference to FIGS. 4 and 5, the pattern mark 322 is consists of a sectional line $\overline{CA}$ with a slope of $\infty$, and a sectional line $\overline{DA}$ with a slope of 1; and the pattern mark 323 consists of a sectional line $\overline{EB}$ with a slope of $\infty$, and a sectional line $\overline{FB}$ with a slope of $-1$. Accordingly, the angle between the lines $\overline{CA}$ and $\overline{DA}$ is 45 degrees, and so is the angle between the lines $\overline{EB}$ and $\overline{FB}$. In addition, both of the pattern marks 322 and 323 are located upstream of the document line 321. After a document 33 is properly positioned in a document region behind the document line 321, and a scanning operation is ready to be performed, the driving device 312 transmits the image pickup device 311 to move along a direction of an arrow G.

Quick Determination of Scan Start Point

The CCD 311 first rapidly moves a predetermined distance L0 from a home position H to a pre-scan position I overlapping with the pattern mark 322 for example by points J and K. At this moment, the CCD 311 reads the coordinates of the points $J(x1,y1)$ and $K(x2,y1)$. As known to those skilled in the art, the length of the sectional line $\overline{JK}$ is equal to $(x2-x1)$. Owing to the specific slopes of and the angle 45° between the sectional lines $\overline{CA}$ and $\overline{DA}$, the sectional line $\overline{JK}$ is perpendicular to the line $\overline{CA}$, and the length of the sectional line $\overline{JA}$ is equal to $(x2-x1)\cot 45°=(x2-x1)$, i.e. the length of the sectional line $\overline{JK}$. Therefore, the CCD 311 will reach the point A by moving a distance L1 equal to $\overline{JA}$ from the pre-scan position I along the direction G, and $$L1=(x2-x1)\cot 45°=x2-x1$$

Afterwards, the CCD 311 further moves a distance L2 from the point A to the scan start point to start a scanning operation. The distance L2 is predetermined to make the scanning operation start when or immediately before the CCD 311 reaches the document line 321. In this embodiment, the document line 321 is used as the scan start S and the distance L2 is set to be the distance between the point A and the document line 321.

Conclusively, the CCD 311 moves an overall distance of (L0+L1+L2) from the home position H to the scan start S. The movement is quick because the distances L0 and L2 are predetermined, and the distance L1 is calculated according to the coordinates of the points $J(x1,y1)$ and $K(x2,y1)$ read at the pre-scan position I, and the geometrical correlation among the points J, K and A.

It is advantageous to use this method to determine the scan start point because the distance L1 is variable with the installation position of the photo-signal processing device. As described above, the CCD 311 moves the predetermined distance L0 from the home position to reach the pre-scan position to read the coordinates of the points J(x1,y1) and K(x2,y1), and then moves the distance L1 to reach the point A. If the photo-signal processing device is inaccurately installed so that the initial position of the CCD 311 is lower than the predetermined home position H, the pre-scan position after the movement of the predetermined distance L0 will be accordingly lower than the pre-scan position I. Therefore, the points O(x1,y2) and T(x7,y7) by which the CCD 311 overlaps with the pattern mark 322 will be lower than the points J(x1,y1) and K(x2,y1), respectively. Accordingly, y1<y7 and x7<x2. In this case, the length of the sectional line $\overline{OT}$=(x7−x1) will be less than the length of the sectional line $\overline{JK}$=(x2−x1), and the length of the sectional line $\overline{OA}$ equal to the length of the sectional line $\overline{OT}$ will be less than the length of the sectional line $\overline{JA}$. In other words, the distance L1 that the CCD 311 moves after pre-scanning will be automatically adjusted to be (x7−x1) rather than (x2−x1) so that the CCD 311 still reaches the point A after the movement of the distance L1.

Calculation of Deflection Rate

When the CCD 311 moves to the pre-scan position I to read the coordinates of the points J(x1,y1) and K(x2,y1) by which the CCD 311 and the pattern mark 322 overlap, the CCD 311 also overlaps with the pattern mark 323 by points U and V, and reads the coordinates of the points U(x3,y1) and V(x4,y1). Accordingly, the detected lengths of the sectional lines $\overline{JK}$ and $\overline{UV}$ are equal to (x2−x1) and (x4−x3), respectively, so that the calculated lengths of the sectional lines $\overline{JA}$ and $\overline{VB}$ are equal to (x2−x1) and (x4−x3), respectively. Therefore, the coordinates of the two intersectional points A(x5,y5) and B(x6,y6) can be estimated by the following equations:

$$x5=x1$$
$$y5=y1+(x2-x1)$$
$$x6=x4$$
$$y6=y1+(x4-x3)$$

The deflection rate m can be calculated by an equation of $$m=(y6-y5)/(x6-x5),$$

in which (x5,y5) and (x6,y6) are defined as above. The deflection rate can be used to correct the scanning result so as to obtain a better scanning quality.

Calculation of Amplification Error

An amplification error ρ can be calculated by an equation of $$\rho=1-[(x6-x5)^2+(y6-y5)^2]^{1/2}/L3$$

in which (x5,y5) and (x6,y6) are defined as above, and $[(x6-x5)^2+(y6-y5)^2]^{1/2}$ and L3 indicates a detected length and a predetermined distance between the two intersectional points A and B, respectively. For example, for a CCD having a resolution of 600 DPI (dot per inch), the predetermined distance, i.e. the total pixel number between the two points A and B, should be L3=10*600=6000 if the length between the two points is assumed to be 10 inches. In case that the detected pixel number between the two points, i.e. $[(x6-x5)^2+(y6-y5)^2]^{1/2}$, is 5700, the amplification error ρ will be 1−5700/6000=0.05. The amplification error can also be used to correct the scanning result so as to obtain a better scanning quality.

Color Calibration

While the CCD 311 passes through the background region 324 of standard white along the direction G, a color calibration can be simultaneously performed together with the pre-scan operation to obtain a light response.

Owing to the provision of the two pattern marks according to the present invention, the overall scanning speed can be improved because the CCD can directly move the distances L0, L1 and L2 quickly without improperly starting the image pickup operation. Furthermore, the deflection rate and the amplification error of the CCD can also be realized, and the color calibration can also be performed while the CCD locates the scan start to enhance the scanned image quality.

Variations of Pattern Marks

Several alternative examples of pattern marks according to the present invention are illustrated in FIGS. 5A~5G, respectively. The determination method by using any of these alternative examples is quite similar to the aforementioned example, and is not to be redundantly described here.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An image scanner, comprising:
a photo-signal processing device moving along a specific direction from a home position for picking up an image of a scanned document, and converting said image into digital data to be further processed; and
a scanning platform for placing thereon said document, having thereon:
a first pattern mark located between said home position and said scan start point, coordinates of a first reference point and a second reference point within said first pattern mark being read when said photo-signal processing device moves to a pre-scan position and performs a pre-scan operation, and said coordinates of said first and said second reference points correlating with a shift from said pre-scan position to a specified point of said first pattern mark along said specific direction through a first mathematical function,
wherein a scan start point of said photo-signal processing device for picking up said image of said scanned document is determined by said coordinates of said first and said second reference points, said first mathematical function, and a predetermined shift from said specified point to said scan start point along said specific direction.

2. The image scanner according to claim 1 wherein said first pattern mark is consisted of a first sectional line of a predetermined first slope and a second sectional line of a predetermined second slope, and said first and said second reference points are ones within said first and said second sectional lines, respectively, and both located within said pre-scan position of said photo-signal processing device.

3. The image scanner according to claim 2 wherein said first and said second sectional lines are connected at said specified point by respective one end thereof, and have a predetermined angle θ therebetween.

4. The image scanner according to claim 3 wherein said first sectional line is parallel to said specific direction, and said predetermined angle between said first and said second sectional lines is 45°.

5. The image scanner according to claim 4 wherein said first mathematical function is $$L1=[(x2-x1)^2+(y2-y1)^2]^{1/2}\cot\theta=[(x2-x1)^2+(y2-y1)^2]^{1/2}$$

in which L1 indicates said shift from said pre-scan position to said specified point along said specific direction, (x1,y1) and (x2,y2) are said coordinates of said first and said second reference points, respectively, $[(x2-x1)^2+(y2-y1)^2]^{1/2}$ indicates a detected length between said two reference points, and $\theta$ is 45°.

6. The image scanner according to claim 5 wherein said photo-signal processing device starts to perform a scanning operation after traveling a distance of (L1+L2) from said pre-scan position along said specific direction, in which L2 is said predetermined shift from said specified point to said scan start point along said specific direction.

7. The image scanner according to claim 6 wherein said photo-signal processing device includes:
   an image pickup device for performing said scanning operation, and detecting said coordinates of said first and said second reference points; and
   a driving device for moving said image pickup device from said home position along said specific direction.

8. The image scanner according to claim 3 wherein a coordinate of said specified point is determined according to said coordinates of said first and said second reference points and a second mathematical function.

9. The image scanner according to claim 8 wherein said scanning platform further has thereon a second pattern mark consisted of a third sectional line and a fourth sectional line, said third and said fourth sectional lines are connected at an intersectional point, a third and a fourth reference points which are respective ones of said third and said fourth sectional lines are located within said pre-scan position of said photo-signal processing device, coordinates of said third and said fourth reference points are read during said pre-scan operation, and a coordinate of said intersectional point is determined according to said coordinates of said third and said fourth reference points and a third mathematical function.

10. The image scanner according to claim 9 wherein a deflection rate m for a scanning result is calculated by an equation of $$m=(y6-y5)/(x6-x5)$$

in which (x5,y5) and (x6,y6) are said coordinates of said specified point and said intersectional point, respectively.

11. The method according to claim 9 wherein an amplification error $\rho$ for a scanning result is calculated by an equation of $$\rho=1-[(x6-x5)^2+(y6-y5)^2]^{1/2}/L3$$

in which (x5,y5) and (x6,y6) are said coordinates of said specified point and said intersectional point, respectively, and $[(x6-x5)^2+(y6-y5)^2]^{1/2}$ and L3 indicates a detected length and a predetermined distance between said specified point and said intersectional point, respectively.

12. The image scanner according to claim 9 wherein a line linking said specified point and said intersectional point is perpendicular to said specific direction.

13. The image scanner according to claim 12 wherein said second pattern mark is a mirror image of said first pattern mark.

14. The image scanner according to claim 1 wherein said first and said second pattern marks are printed with black, and a background of said pattern marks is standard white for a color calibration during said pre-scan operation to obtain a light response.

15. A method for quick determination of a scan start point for an image scanner, said image scanner including a photo-signal processing device which moves from a home position along a specific direction for picking up an image of a scanned document, and converts said image into digital data to be further processed, and a scanning platform for placing thereon said document, which has thereon a first pattern mark located between said home position and said scan start point, and having a specified point being a predetermined first shift to said scan start point along said specific direction, and said method comprising steps of:
   (a) said photo-signal processing device moving from said home position along said specific direction to a pre-scan position overlapping with said first pattern mark;
   (b) said photo-signal processing device performing a pre-scan operation at said pre-scan position to read coordinates of a first reference point and a second reference point within said first pattern mark;
   (c) determining a second shift from said pre-scan position to said specified point along said specific direction according to said coordinates of said first and said second reference points, and a first mathematical function related to a pattern of said first pattern mark; and
   (d) said photo-signal processing device moving from said pre-scan position along said specific direction a total shift in relation to said first and said second shifts so that said photo-signal processing device can quickly reach said scan start point, and start a scanning operation.

16. The method according to claim 15 wherein said first pattern mark is consisted of a first sectional line and a second sectional line, said first and said second sectional lines intersect at said specified point, and said first and said second reference points in said step (b) are ones within said first and said second sectional lines, respectively.

17. The method according to claim 16 further comprising after said step (b) a step of determining a coordinate of said specified point according to said coordinates of said first and said second reference points, and a second mathematical function.

18. The method according to claim 17 wherein said scanning platform of said image scanner has further thereon a second pattern mark, and in said step (a), said pre-scan position of said photo-signal processing device overlaps with both of said first and said second pattern mark.

19. The method according to claim 18 wherein in said step (b), said photo-signal processing device performs said pre-scan operation at said pre-scan position to read coordinates of a third and a fourth reference points within said second pattern mark in addition to said first and said second reference point.

20. The method according to claim 19 wherein said second pattern mark is consisted of a third sectional line and a fourth sectional line, said third and said fourth sectional lines are connected at an intersectional point, and said third and said fourth reference points are respective ones of said third and said fourth sectional lines.

21. The method according to claim 20 further comprising after said step (b) a step of determining a coordinate of said intersectional point according to said coordinates of said third and said fourth reference points, and a third mathematical function.

22. The method according to claim 21 further comprising after said step (c) a step of calculating a deflection rate m for a scanning result is calculated by an equation of $$m=(y6-y5)/(x6-x5)$$

in which (x5,y5) and (x6,y6) are said coordinates of said specified point and said intersectional point, respectively.

23. The method according to claim 21 further comprising after said step (c) a step of calculating an amplification error of a scanning result by an equation of $$\rho=1-[(x6-x5)^2+(y6-y5)^2]^{1/2}/L3$$

in which (x5,y5) and (x6,y6) are said coordinates of said specified point and said intersectional point, respectively, and $[(x6-x5)^2+(y6-y5)^2]^{1/2}$ and L3 indicates a detected length and a predetermined distance between said specified point and said intersectional point, respectively.

24. The method according to claim 16 wherein said first and said second sectional lines are connected at said specified point by respective one end thereof, and have a predetermined angle therebetween.

25. The method according to claim 24 wherein said first sectional line is parallel to said specific direction, and said predetermined angle is 45°.

26. The method according to claim 25 wherein said first mathematical function in said step (c) is $$L1=[(x2-x1)^2+(y2-y1)^2]^{1/2} \cot 45°=[(x2-x1)^2+(y2-y1)^2]^{1/2}$$

in which L1 indicates said second shift, (x1,y1) and (x2,y2) are said coordinates of said first and said second reference points, respectively, and $[(x2-x1)^2+(y2-y1)^2]^{1/2}$ indicates a detected length between said two reference points.

27. The method according to claim 26 wherein said scanning platform of said image scanner has further thereon a second pattern mark consisted of a third sectional line and a fourth sectional line which are connected at an intersectional point by respective one end thereof and have a predetermined angle 45°, and said fourth sectional line is parallel to said specific direction.

28. The method according to claim 27 wherein said second pattern mark is substantially a mirror image of said first pattern mark.

29. The method according to claim 15 wherein in said step (d), said total shift of photo-signal processing device is a sum of said second shift determined in said step (c), and said predetermined first shift.

30. The method according to claim 15 wherein said first and said second pattern marks are printed with black, a background of said pattern marks is standard white, and a color calibration is performed in said step (b) during said pre-scan operation to obtain a light response.

\* \* \* \* \*